United States Patent Office 3,115,523
Patented Dec. 24, 1963

3,115,523
NOVEL 1H-3,1,4,2-BENZOXADIAZABOREPINES
Harry Louis Yale, New Brunswick, N.J., assignor to Olin Mathieson Chemical Corporation, New York, N.Y., a corporation of Virginia
No Drawing. Filed Sept. 25, 1961, Ser. No. 140,258
10 Claims. (Cl. 260—551)

This invention relates to cyclic boron compounds. More particularly, the invention relates to compounds represented by the structural formula (I)

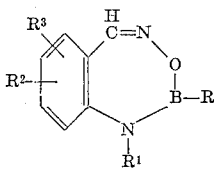

In the above formula, the symbol R represents hydroxy, alkyl, cycloalkyl, aryl and aralkyl groups. The aryl groups represented by R include the monocyclic phenyl group or bicyclic naphthyl group each of which may in addition bear one or more (preferably up to three) substituents such as lower alkyl, e.g. methyl, ethyl, propyl, isopropyl, butyl and the like, a halogen, e.g. chlorine, bromine, iodine or fluorine, or a lower alkoxy group such as methoxy, ethoxy and the like. The aralkyl groups represented by R include the phenyl group, substituted or unsubstituted as described above, attached to a straight or branched chain lower alkylene chain. The alkyl groups represented by R are preferably lower alkyl groups such as those illustrated above and the cycloalkyl groups include cycloaliphatic groups, preferably containing 3 to 6 carbon atoms, such as cyclopropyl, cyclobutyl, cyclopentyl and cyclohexyl.

$R^1$ represents hydrogen as well as alkyl, aryl and aralkyl groups of the character defined above. It also represents basic groups such as di-lower alkylamino-lower alkylene groups, e.g. dimethylaminomethyl, dimethylaminopropyl, diethylaminoethyl, and the like; the nitrogen of the basic group may also be part of a 5- to 6-membered heterocyclic to form substituents such as piperidinomethyl, piperidinoethyl, morpholinomethyl, pyrrolidinomethyl and the like.

$R^2$ and $R^3$ are representative of hydrogen, halogen, alkoxy, sulfonamido, alkyl and haloalkyl. The alkyl and alkoxy groups are preferably lower alkyl and lower alkoxy groups of the character described previously in the discussion of the symbol R. The haloalkyl groups represented by $R^2$ and $R^3$ include monohalogenated groups such as chloromethyl, bromoethyl and the like, as well as polyhalogenated groups such as trifluoromethyl. Any halogen may appear in these substituents.

Compounds of this invention include, for example, 2-phenyl - 1H - 3,1,4,2 - benzoxadiazaborepine, 7 - chloro - 2 - (2 - naphthyl) - 1H - 3,1,4,2 - benzoxadiazaborepine, 7 - methyl - 2 - (2,4 - dimethylphenyl) - 1H - 3,1,4,2 - benzoxadiazaborepine, 2-(2-mesityl)-7-sulfonamido-1H-3,1,4,2-benzoxadiazaborepine, 2-(p-anisyl)-1-(3-dimethylaminopropyl) - 1H - 3,1,4,2 - benzoxadiazaborepine, 6,7 - dimethoxy - 2(2 - phenethyl) - 1H - 3,1,4,2 - benzoxadi - azaborepine; 8 - bromo - 2 -(n - propyl) - 1H - 3,1,4,2 - benzoxadiazaborepine.

The compounds of this invention are useful as hypotensive agents and as central depressants in psychotherapy. They are useful also in the diagnosis of glioma and may be useful for the alleviation of symptoms or treatment thereof. They may be administered orally or parenterally in conventional vehicles according to customary practice.

The compounds of Formula I are produced by reacting a compound of the formula (II)

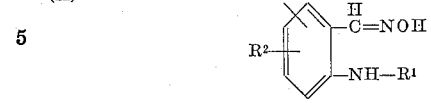

wherein the symbols have the meaning already defined, with a boronic acid of the formula (III)    R—B—(OH)$_2$ wherein R has the meaning already defined.

The reaction between the compound of Formula II and boronic acid is preferably effected in a non-aqueous medium, e.g. a hydrocarbon solvent such as xylene, toluene, petroleum ether, or the like, or another inert solvent such as diethyleneglycol dimethyl ether, dioxane, carbontetrachloride, etc., or mixtures thereof. A mixture of the reactants may be heated and the water formed in the reaction is removed azeotropically. Anhydrous reactants and solvents contribute to a more effective reaction.

The intermediates of Formula II are prepared by converting the anthranilic or substituted anthranilic acid by means of methanol and sulfuric acid to the methyl ester; the latter, by the procedure of Albert [J. Chem. Soc. 1225 (1948)], are converted next to the carbohydrazide, then to the p-tolylsulfoncarbohydrazide, and the latter decomposed in ethylene glycol by means of anhydrous sodium carbonate to the aldehyde. The aldehyde, by treatment with hydroxylamine in aqueous alkaline solution, gives the oxime, which is liberated from its alkali metal salt by acidification.

The following examples are illustrative of the invention. All temperatures are stated on the centigrade scale.

Example 1

A mixture of 1.36 g. of anthranilaldehyde oxime, 1.22 g. of benzene boronic acid and 100 ml. of dry xylene are heated for three hours using a Dean-Stark water separator. The yellow product separates from the boiling solution during this time. The reaction mixture is cooled and the solid filtered. The yellow solid is triturated with ether to obtain the product, 2-phenyl-1H-3,1,4,2-benzoxadiazaborepine, M.P. 249–251°.

Example 2

(a) A mixture of 39.5 g. of 6-chloroisatoic anhydride in 500 ml. of 95% ethanol is treated with 23.5 g. of 85% hydrazine hydrate. Subsequently, the mixture is refluxed for two hours and concentrated to dryness to give 5-chloroanthranilhydrazide. This product, by the procedure of A. Albert [J. Chem. Soc. 1225 (1948)] gives 5-chloroanthranilaldehyde; and 17.1 g. of the aldehyde, 36.0 g. of hydroxylamine hydrochloride and 1000 ml. of 1.05 N aqueous sodium hydroxide solution, warmed for 15 minutes in the steam bath, filtered, and the filtrate cooled and acidified with hydrochloric acid gives 5-chloroanthranilaldehyde oxime.

(b) By substituting 1.71 g. of 5-chloroanthranilaldehyde oxime for the anthranilaldehyde oxime and 1.72 g. of 2-naphthalene boronic acid for the benzeneboronic acid in Example 1, there is obtained 7-chloro-2-(2-naphthyl)-1H-3,1,4,2-benzoxadiazaborepine.

Example 3

(a) By substituting 17.7 g. of 6-methylisatoic anhydride for the 6-chloroisatoic anhydride in Example 2(a) there is obtained 5-methylanthranilaldehyde oxime.

(b) By substituting 1.51 g. of 6-methylanthranilaldehyde oxime for the anthranilaldehyde oxime and 1.50 g.

of 2,4-dimethylbenzeneboronic acid for the benzeneboronic acid in Example 1, there is obtained 2-(2,4-dimethylphenyl)-7-methyl-1H-3,1,4,2-benzoxadiazaborepine.

Example 4

(a) 5-sulfoanthranilic acid, 21.7 g., 400 ml. of n-butanol and 1.0 g. of p-toluenesulfonic acid are refluxed under a device for removing the water formed during the reaction and distilling as a water-n-butanol azeotrope. The esterification is complete in about three hours. The mixture is concentrated to dryness. The residue, consisting of 5-sulfoanthranilic acid, butyl ester, 50 ml. of thionyl chloride and 2.5 ml. of N,N-dimethylformamide are refluxed for four hours and then concentrated to dryness. The residue, consisting of 5-chlorosulfonylanthranilic acid, butyl ester, is added slowly, with ice cooling to 100 ml. of concentrated ammonia. The mixture is then allowed to stand overnight at room temperature and the product, 5-sulfonamidoanthranilic acid, butyl estfier is filtered.

(b) The product from (a), 25 ml. of hydrazine hydrate and 100 ml. of 95% ethanol are refluxed for three hours and then concentrated to give 5-sulfonamidoanthranilhydrazide. This product, by the procedure of A. Albert [supra] gives 5-sulfonamidoanthranilaldehyde. The aldehyde, hydroxylamine hydrochloride and aqueous sodium hydroxide as in Example 2(a) gives 5-sulfonamidoanthranilaldehyde oxime.

(c) By substituting 2.15 g. of 5-sulfonamidoanthranilaldehyde oxime for the anthranilaldehyde oxime and 1.64 g. of mesityleneboronic acid for the benzeneboronic acid in Example 1, there is obtained 2-(2-mesityl)-7-sulfonamido-1H-3,1,4,2-benzoxadiazaborepine.

Example 5

(a) To a solution of 19.3 g. of anhydrous sodium carbonate in 150 ml. of water is added portionwise 50 g. of anthranilic acid, followed by 50 g. of 3-dimethylaminopropyl chloride, also added slowly. The mixture is stirred and refluxed for two hours to give 63 g. of N-(3-dimethylaminopropyl)anthranilic acid.

(b) To 15 g. of anhydrous potassium carbonate in 300 ml. of water is added slowly 62.5 g. of the product from (a) above, followed by the slow addition of 37.0 g. of ethyl chloroformate. The precipitated solid is filtered to give 70.3 g. of N-carboxy-N-(3-dimethylaminopropyl)anthranilic acid, N-ethyl ester.

(c) The product from (b) is placed in a preheated oil bath at 220° and heated one-half hour at 220° to give 35.6 g. of 1-(3-dimethylaminopropyl)isatoic anhydride.

(d) By substituting 59.6 g. of 1-(3-dimethylaminopropyl)isatoic anhydride for the chloroisatoic anhydride in Example 2(a), there is obtained N-(3-dimethylaminopropyl)anthranilaldehyde oxime.

(e) By substituting 2.16 g. of the product from (d) above for the anthranilaldehyde oxime and 1.52 g. of p-anisoleboronic acid for the benzeneboronic acid in Example 1, there is obtained 2-(p-anisyl)-1-(3-dimethylanimopropyl)-1H-3,1,4,2-benzoxadiazaborepine.

Example 6

(a) By substituting 44.6 g. of 5,6-dimethoxyisatoic anhydride for the 6-chloroisatoic anhydride in Example 2(a), there is obtained 5,6-dimethoxyanthranilaldehyde oxime.

(b) By substituting 1.96 g. of 5,6-dimethoxyanthranilaldehyde oxime for the anthranilaldehyde oxime and 1.72 g. of 2-phenylethaneboronic acid for the 2-benzeneboronic acid of Example 1, there is obtained 6,7-dimethoxy-2-(2-phenethyl)-1H-3,1,4,2-benzoxadiazaborepine.

Example 7

(a) By substituting 48.4 g. of 7-bromoisatoic anhydride (prepared from 4-bromoanthranilic acid and phosgene in aqueous sodium carbonate solution) for the 6-chloroisatoic anhydride in Example 2, there is obtained 4-bromoanthranilaldehyde oxime.

(b) By substituting 2.2 g. of 4-bromoanthranilaldehyde oxime for the anthranilaldehyde oxime and 0.88 g. of n-propaneboronic acid, for the benzeneboronic acid in Example 1, there is obtained 8-bromo-2-(n-propyl)-1H-3,1,4,2-benzoxadiazaborepine.

What is claimed is:

1. A compound of the formula

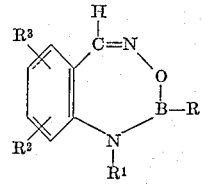

wherein R represents a member of the group consisting of hydroxy, lower alkyl, cycloalkyl of 3 to 6 carbon atoms, monocyclic aryl and bicyclic aryl bearing 0 to 3 members of the group consisting of lower alkyl, lower alkoxy and halogen and phenyl-lower alkylene bearing in the phenyl ring 0 to 3 members of the group consisting of lower alkyl, lower alkoxy and halogen; $R^1$ represents a member of the group consisting of hydrogen, lower alkyl, monocyclic aryl and bicyclic aryl bearing 0 to 3 members of the group consisting of lower alkyl, lower alkoxy and halogen and phenyl-lower alkylene bearing in the phenyl ring 0 to 3 members of the group consisting of lower alkyl, lower alkoxy and halogen; and $R^2$ and $R^3$ are each selected from the group consisting of hydrogen, halogen, sulfonamido, lower alkyl, lower alkoxy and halo-lower alkyl.

2. A compound of the formula

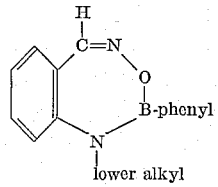

3. A compound of the formula

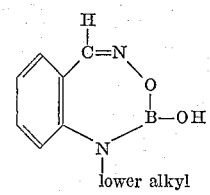

4. A compound of the formula

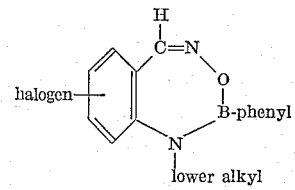

5. A compound of the formula

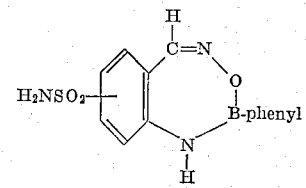

6. 2-phenyl-1H-3,1,4,2-benzoxadiazaborepine.
7. 7 - chloro - 2 - (2 - naphthyl) - 1H - 3,1,4,2 - benzoxadiazaborepine.
8. A process for the production of compounds of the formula

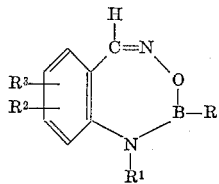

wherein R represents a member of the group consisting of hydroxy, lower alkyl, cycloalkyl of 3 to 6 carbon atoms, monocyclic aryl and bicyclic aryl bearing 0 to 3 members of the group consisting of lower alkyl, lower alkoxy and halogen, and phenyl-lower alkylene bearing on the phenyl ring 0 to 3 members of the group consisting of lower alkyl, lower alkoxy and halogen; $R^1$ represents a member of the group consisting of hydrogen, lower alkyl, monocyclic aryl and bicyclic aryl bearing 0 to 3 members of the group consisting of lower alkyl, lower alkoxy and halogen, and phenyl-lower alkylene bearing on the phenyl ring 0 to 3 members of the group consisting of lower alkyl, lower alkoxy and halogen; and $R^2$ and $R^3$ are each selected from the group consisting of hydrogen, halogen, sulfonamido, lower alkyl, lower alkoxy and halo-lower alkyl, which comprises reacting a compound of the formula

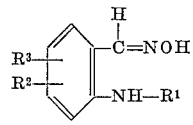

wherein $R^1$, $R^2$ and $R^3$ have the same meaning as above, with a boronic acid of the formula

R—B—(OH)$_2$ wherein R has the same meaning as above in a non-aqueous medium.

9. A process for the production of a compound of the formula

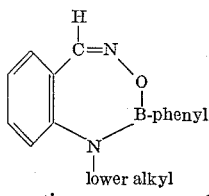

which comprises reacting a compound of the formula

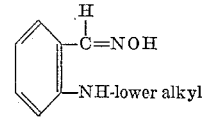

with benzeneboronic acid in a non-aqueous medium.

10. A process for the production of 2-phenyl-1H-3,1,4,2 - benzoxadiazaborepine which comprises heating anthranilaldehyde oxime with benzeneboronic acid in a non-aqueous medium.

No references cited.